United States Patent [19]

Wronski et al.

[11] 3,783,324

[45] Jan. 1, 1974

[54] PHOTOSENSITIVE CHARGE STORAGE ELECTRODE HAVING A SELECTIVELY CONDUCTING PROTECTIVE LAYER OF MATCHING VALENCE BAND ON ITS SURFACE

[75] Inventors: Christopher Roman Wronski; Woongsoon Michael Yim; Joseph Dresner, all of Princeton, N.J.

[73] Assignee: RCA Corporation, New York, N.Y.

[22] Filed: Sept. 11, 1972

[21] Appl. No.: 287,859

[52] U.S. Cl. .................... 313/65 A, 313/94

[51] Int. Cl. .................... H01j 31/28

[58] Field of Search .............. 313/65 R, 65 A, 65 T, 313/94, 65 AB

[56] References Cited

UNITED STATES PATENTS

| | | | |
|---|---|---|---|
| 3,346,755 | 10/1967 | Dresner | 313/65 A X |
| 3,350,595 | 10/1967 | Kramer | 313/94 |
| 3,571,646 | 3/1971 | Kiuchi et al. | 313/94 |

*Primary Examiner*—Herman Karl Saalbach
*Assistant Examiner*—Siegfried H. Grimm
*Attorney*—G. H. Bruestle, Donald S. Cohen and Sanford J. Asman

[57] ABSTRACT

A photosensitive charge storage electrode comprises a photoconductive substrate having a bulk region with a surface region of reduced conductivity. On the surface region is a selectively insulating layer of a composition such that the top of the valence band of the layer is essentially at the same energy level as the top of the valence band in the bulk region of the photoconductive substrate.

4 Claims, 5 Drawing Figures

PHOTOSENSITIVE CHARGE STORAGE ELECTRODE HAVING A SELECTIVELY CONDUCTING PROTECTIVE LAYER OF MATCHING VALENCE BAND ON ITS SURFACE

BACKGROUND OF THE INVENTION

The present invention relates to photosensitive electrical charge storage electrodes.

Photosensitive electrical charge storage electrodes are used, for example, for photoreproduction and in electrical image pickup tubes, such as vidicon television camera tubes. They are used in vidicon television camera tubes as a photoconductive storage target which is scanned by an electron beam.

One type of vidicon target utilizes a cadmium selenide photoconductive layer. Such a target is described for instance in:

U.S. Pat. No. 3,571,646 issued to Yuji Kiuchi et al. on 23 Mar. 1971 (U.S. Cl. 313/94).

Shimizu, K. et al., "Characteristics of the New Vidicon-Type Camera Tube Using *CdSe* as a Target Material," *Japanese Journal of Applied Physics*, Volume 6, No. 9, Pages 1,089–1,095, Sept. 1967.

Yoshida, O. et al., "Properties of $CdSe$–$Sb_2S_3$ Vidicon-Type Targets," *Japanese Journal of Applied Physics, Volume* 7, Page 439 (1968).

Shimizu, K. et al., "Characteristics of Experimental CdSe Vidicons," *IEEE Transportations on Electron Devices*, Volume Ed. 18, NO. 11, Pages 1,058–1,062, November 1971.

A cadmium selenide vidicon target includes, in general, a photoconductor layer of N-type cadmium selenide (*CdSe*) on a transparent conductive signal electrode layer. THe CdSe layer has a bulk region and a wider bandgap oxidized surface region about 150 nanometers thick. On the wider bandgap surface region is a thin protective layer of arsenic trisulphide ($As_2S_3$). Certain characteristics of this *CdSe* target are highly desirable for vidicon operation. For example, the 1.7 electron volt bandgap of *CdSe* is particularly well suited for pickup of visible light images. The sensitivity is high. Because the structure is continuous, processing is greatly simplified over that needed for making discrete array targets, such as silicon diode array targets.

One problem with a *CdSe* vidicon target as described generally above, however, is that the target voltage for operation is relatively high, about 40 or 50 volts, as compared to the target voltage of 10 or 20 volts for other, more common types of vidicons, such as lead oxide or antimony trisulphide types. The high target voltage is required in order to eliminate the appearance of a negative after-image in the signal when an image pattern is removed and the target exposed to uniform illumination. A high operating voltage for the target has the accompanying disadvantages of increasing the dark current and reducing the target lifetime. Also, the operating voltage range is reduced, making operation characteristics of the target more critical.

SUMMARY OF THE INVENTION

The novel charge storage electrode comprises a photoconductive substrate having a bulk region with a surface region of reduced electrical conductivity. On the surface region is a layer of selectively insulating material. The selectively insulating layer material is more conductive across its thickness to holes than to electrons and has a bandgap such that the top of the valence band in the material is essentially at the same energy level as the top of the valence band in the bulk region of the photoconductive substrate.

For the case of a *cdSe* type vidicon target, the novel electrode structure minimizes after-imaging and permits operation with high sensitivity and low dark current at relatively low target voltage, while increasing the target operating lifetime. The structure also broadens the operating voltage range of a CdSe type vidicon so that its operating characteristics become less critical.

PREFERRED EMBODIMEMT OF THE INVENTION

Figure 1:
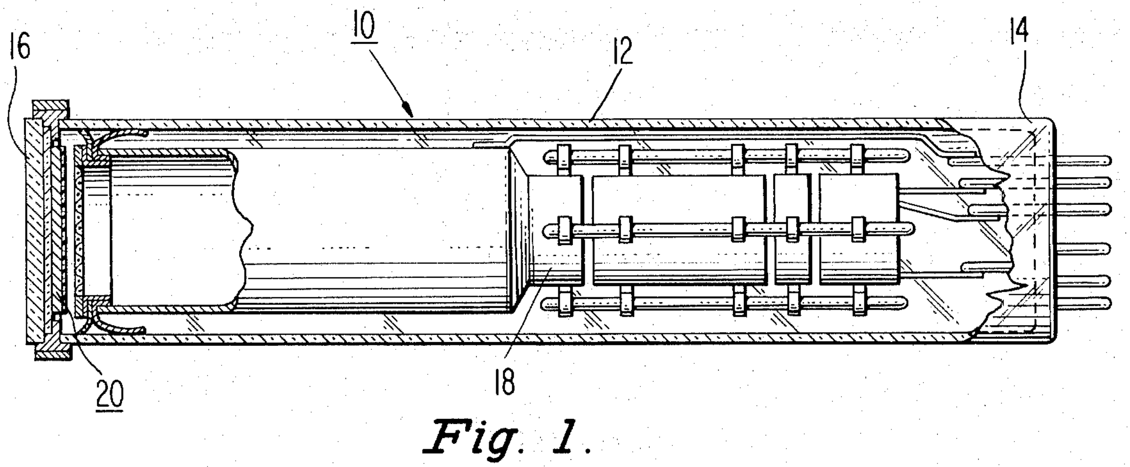
FIG. 1 is a partially sectioned side view of a vidicon camera tube utilizing the novel storage layer.

Structure - A preferred embodiment of the invention is a target in a vidicon camera tube 10 shown in FIG. 1 of the drawings. The tube 10 has an elongated glass envelope 12 with a stem 14 at one end and a glass faceplate 16 at the other. Inside the envelope 12 is an electron gun assembly 18 for forming an electron beam. Focus and deflection coils, not shown, focus and deflect the beam to scan a raster on the target 20 on the inside surface of the faceplate 16.

Figure 2:
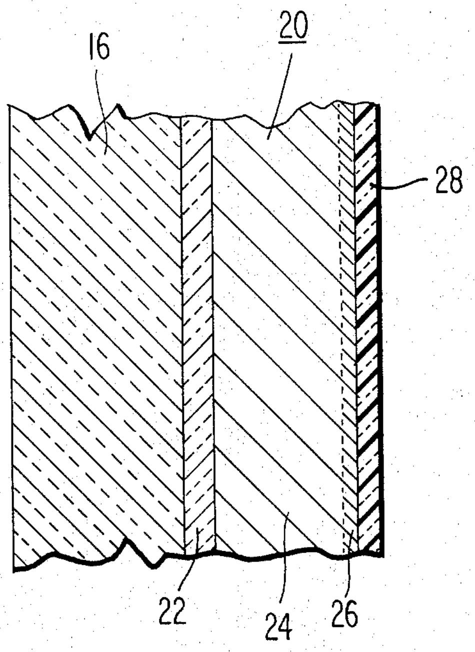
FIG. 2 is a greatly exaggerated sectional view of a fragment of the storage layer of the tube of FIG. 1.

The target 20 is shown in exaggerated detail in FIG. 2. Beginning from the inside surface of the faceplate 16, there is first a transparent conductive signal electrode layer 22 of tin oxide about 100 nanometers thick. On the signal electrode layer 22 is a photoconductor layer 24 of cadmium selenide (*CdSe*) about 2,000 nanometers thick. The cadmium selenide of the photoconductor layer 24 is polycrystalline, has a hexagonal crystal structure with the c axis perpendicular to the faceplate surface, and has a dark resistivity of about $10^8$ ohm-centimeters. A surface region 26 is formed in the photoconductor layer 24 by superficial oxidation of the cadmium selenide to reduce its conductivity. The surface region 26 has a dark resistivity of about $10^{11}$ ohm-centimeters. The surface region 26 extends about one nanometer into the bulk of the photoconductor layer 24. On the surface region 26 of the photoconductor 24 is a protective layer 28 of arsenic-tellurium-selenium alloy glass having a thickness of 950 nanometers. The alloy contains about 12 atomic percent arsenic, 29 atomic percent tellurium, and 59 atomic percent selenium.

MANUFACTURE - To make the target 20, the cadmium selenide photoconductor layer 24 is deposited on the tin oxide signal electrode layer 22 of the faceplate 16 by vapor deposition. Then a pressed cadmium selenide powder of 99.999% purity is placed in an alumina-coated molybdenum boat inside a vacuum processing chamber. Adjacent the cadmium selenide-containing boat is a second, similar boat containing a 99.999 percent purity selenium pellet. The faceplate 16 is mounted on a resistance heater directly above the two boats, spaced from them a distance of about 10 centimeters. The chamber is evacuated to about $10^{-6}$ torr pressure. The faceplate 16 is then resistance-heated to a temperature of about 480°C and the first and second boats simultaneously heated to 725°C and 275°C, respectively, for 2 or 3 minutes to initiate evaporation therefrom. A shutter located between the boats and the faceplate 16 is then removed to permit deposition of the evaporated materials on the signal electrode layer 22. Deposition is continued for about 30 minutes. The resulting photoconductor layer 24 is about 2,000 nanometers thick.

After deposition of the cadmium selenide photoconductor layer 24, the faceplate 16 is removed from the chamber and enclosed in an ampoule in an ambient of 60 percent oxygen by volume and 40 percent nitrogen by volume at about standard temperature and pressure. The ampoule is maintained at about 400°C in a furnace for about 1 hour to form the oxidized surface region 26.

The vitreous alloy protective layer 28 is formed on the surface region 26 by vapor deposition from an aluminacoated molybdenum boat in a vacuum chamber, generally as for the cadmium selenide layer above. A powdered alloy of 10 atomic percent arsenic, 30 atomic percent tellurium, and 60 atomic percent selenium is placed in the boat. The boat is then resistance heated to about 350°C for a half minute prior to removal of the shutter to initiate deposition. Deposition is continued for about 1 minute to form the protective layer 28.

Figure 3:
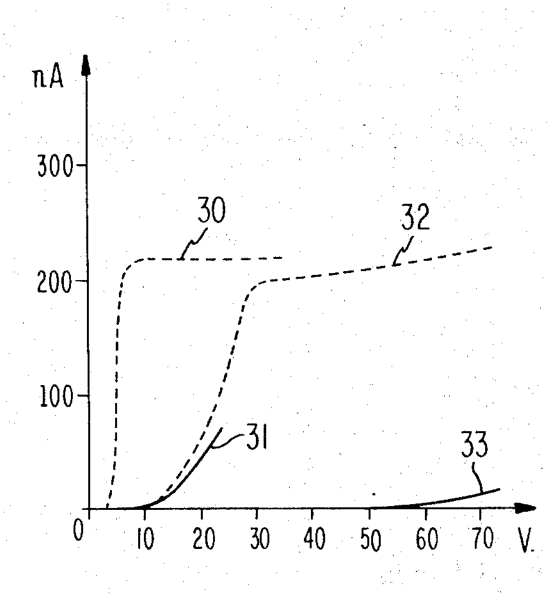
FIG. 3 is a graph illustrating roughly the comparative current-voltage characteristics of the target of FIG. 1 as compared to a prior art target.

Certain operating characteristics of the tube 10 with the novel target 20 are illustrated in FIG. 3. The dashed line 30 and its companion line 31 represent approximately the photocurrent (in nanoamperes) and the dark current (in nanoamperes), respectively, of the tube 10 as a function of the target voltage (in volts). The dashed line 32 and its companion line 33 represent approximately the photocurrent and dark current, respectively, of a vidicon having a prior art cadmium selenide target covered by an arsenic trisulphide protective layer and operated under similar conditions. A significant feature of the operating characteristic of the target 20 of the preferred embodiment is a high photosensitivity at low target voltage with low dark current. The dashed line 30 representing the photocurrent of the target 20 shows the photocurrent reaching saturation at only about 5 volts, at which target voltage the dark current is relatively low. The optimum operating voltage, which is generally one giving maximum photocurrent with minimum dark current, thus is between about 5 and about 10 volts, considerably lower than the operating voltage of the prior art target. The mode of operation of the tube 10 and the charge storage mechanisms of the target 20 are in general similar to those common to vidicons having a target with a single, continuous junction. However, the charge storage mechanism of the target 20 of the tube 10 is different from that of prior cadmium selenide targets in at least one important respect. Due to the matching of the tops of the valence bands of the protective layer and the photoconductor bulk, any spurious charge storage at the interface, with its accompanying after-imaging is minimized.

Figures 4, 5:
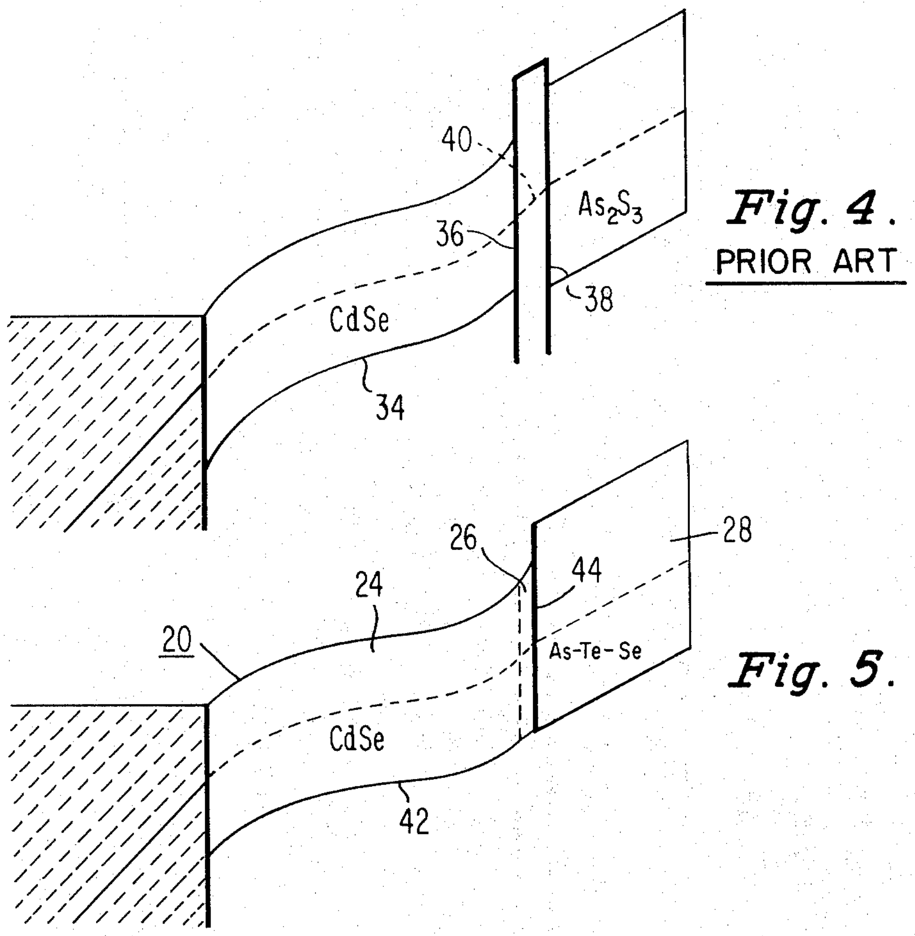
Fig. 4. PRIOR ART, Fig. 5.
FIG. 4 is an exaggerated energy band diagram of a prior art storage layer.
FIG. 5 is an exaggerated energy band diagram of the storage layer of the tube of FIG. 1.

FIG. 4 shows an exaggerated energy band diagram of an unilluminated prior art, arsenic-trisulphide-covered, cadmium-selenide vidicon target and the back-biased state. The level of the top of the valence band, shown by the line 34, at the interface 36 of the cadmium selenide and the surface region is higher than the level at the interface 38 of the surface barrier region and the protective layer by roughly the magnitude of the voltage across the wider bandgap surface region, as shown by the rising Fermi level line 40 in that region. The difference in levels results, in effect, in an unwanted barrier to the passage of photogenerated holes. This unwanted barrier results in a spurious charge storage pattern at normal vidicon target operation voltages. It is therefore necessary to operate the target at higher voltages, despite the loss of certain desirable operation characteristics which accompany low voltage operation.

FIG. 5 shows an exaggerated energy band diagram of the novel vidicon target 20. The levels of the tops of the valence band 42 of the protective layer 28 and of the photoconductor layer 24 are matched to prevent spurious charge storage. The surface region 26 has essentially the same bandgap as the bulk region of the photoconductor and is so thin (about one nanometer) that there is no appreciable rise in the Fermi level in that region. Since there is no spurious charge accumulation at the interface 44, only a relatively low voltage across the target is needed for operation.

GENERAL CONSIDERATIONS

The matching of the valence bands of the target 20 is made possible, in large part, by the relatively unique character of the As-Te-Se alloy used as the protective layer material. The constituents of the alloy are completely miscible within the range of compositions which are suitable for vidicon target purposes and are sufficiently stable thermally to protect the photoconductor layer during tube bakeout. The arsenic content of the alloy powder which is evaporated to form the layer may vary from 5 to 15 atomic percent and the tellurium content may vary from 15 to 40 atomic percent. Thus, the valence band of the alloy may be adjusted by choice of composition so that the top of the valence band is matched by being essentially at the same energy level as that of the photoconductor layer, or within on the order of 0.1 electron volt of the same energy level.

The term "protective," as applied to the protective layer, is used primarily for convenient reference to the layer, as is not to be taken as necessarily defining the function of the layer. While the actual functioning of the protective layer in combination with the photoconductive substrate is not yet completely understood, it is believed that the alloy protective layer on the scanned surface of the target protects the underlying structure by preventing the higher energy electrons in the scanning beam from traveling directly to the bulk of the photoconductive layer as dark current. Beam electrons are "thermalized" in the alloy by their giving up enough energy to the alloy layer to bring their energy near the Fermi energy level of the target before they reach the photoconductor. Effective thermalization of beam electrons permits the use of a relatively thin protective layer; a thin protective layer has desired increased lateral resistivity increased capacitance, and better transfer of photogenerated carriers across its thickness between the photoconductor and the beam. A vidicon target having a thermalizing layer is described, for instance, in U. S. Pat. No. 3,585,430 issued 15 June 1971 to R. E. Simon et al.

While the protective layer of the preferred embodiment is an As-Te-Se alloy glass which has been found to be particularly suitable for use with a cadmium selenide photoconductive layer, other materials, such as other selenium glasses may be found which similarly have the required properties for the protective layer. The required properties are defined by the sheet resistivity, the conductivity, and the bandgap.

For a vidicon target, the sheet resistivity of the protective layer must be at least about $10^{13}$ ohms per square to permit operation at vidicon frame rates of 1/30 second without undue lateral leakage of charge. Greater sheet resistivities permit longer storage times, but may have undesirable effects on the operating characteristics of the storage layer insofar as broadcast vidicon tubes are concerned. For other applications, such as for slow scan pickup tubes or for photoreproduction, however a higher sheet resistivity is generally required.

The conductivity across the protective layer should be selectively greater for holes than for electrons. This permits the ready conduction of holes so that the beam may recharge the target to generate a signal, while preventing the higher energy electron of the beam from passing directly to the bulk photoconductor as dark current. The bandgap of the protective layer should be generally about 2 electron volts. Whatever photoconductor is used, the bandgap of the protective layer is chosen so that the valence band matches that of the photoconductor bulk.

When the protective layer is an As-Te-Se alloy glass and the storage layer is a vidicon target, the alloy should contain at least 7 percent arsenic, for thermal stability. The tellurium content should be sufficient to determine the conductivity and lag to within desirable limits. Insufficient tellurium results in excessive lag and after-imaging as a result of excess hole traps in the alloy. Too much tellurium, on the other hand, results in a resistivity which is too low to maintain charge storage laterally for the minimum time, on the order of 1/30 second, needed for vidicon operation. For vidicon targets, the thickness of the protective layer is preferably from about 50 nanometers to about 1,000 nanometers, depending on the desired operating voltage for the target. The composition of the alloy can be varied, within the limits discussed above, by varying the composition of the powdered alloy from which the protective layer is evaporated as follows: from about 5 atomic percent to about 15 atomic percent arsenic; from about 15 atomic percent to about 40 atomic percent tellurium; and from about 50 atomic percent to about 70 atomic percent selenium. The actual composition of the evaporated layer will vary from the composition of the powdered alloy by being somewhat richer in arsenic, since arsenic has a lower vapor pressure than Te or Se. The to be is thought toke generally on the order of that of the preferred embodiment—namely, about 2 atomic percent more arsenic and about 1 atomic percent less for each of Te and Se. Thus it is believed that the actual composition range for the As-Te-Se protective layer is as follows: from about 7 to about 17 atomic percent arsenic; from about 14 to about 39 atomic percent tellurium; and from about 49 to about 69 atomic percent selenium.

The surface region, which as a resistivity of from about $10^{10}\Omega$-cm to about $10^{13}\Omega$-cm, is provided primarily for passivation of the cadmium selenide at the interface between the cadmium selenide and the protective layer. Without a conductivity modifier, there would be ionization of traps at the cadmium selenide surface. This ionization would result in an accumulation of positive charge at the interface when the target is biased. The oxygen fills these traps and makes the surface more intrinsic, reducing its conductivity. This prevents such accumulation of charge. The surface region need only be very thin, on the order of a monolayer of cadmium selenide, to provide the necessary passivation. Other conductivity modifiers can presumably be used to reduce the conductivity in the surface region. A reduced conductivity surface region may also be provided by a separately applied layer of material other than the bulk photoconductor. For that matter, the conductivity modifier may be provided solely by the interaction of surface states of the cadmium selenide with the adjacent protective layer material at the interface. It is desirable, however, to have the surface region as thin as possible so that it does not present a barrier to holes.

While the novel electrical charge storage layer has been described in the preferred embodiment as a structure for use in a vidicon target, it is also useful for electrophotography. For example, the novel layer may be applied to a cylinder for use as a xerographic photoreproduction cylinder. A charge pattern is impressed on the layer on the cylinder in response to an incident image of the pattern to be reproduced. Then a toner is applied to the cylinder, the toner being selectively affected by the charged areas. The cylinder is then rolled across a material on which the reproduced image is to be impressed, so that the toner is applied to the surface of the material in accordance with the initially impressed electron charge pattern. An advantage of the novel electron charge storage layer over various presently used types of photoreproduction layers is that its sensitivity to visible light is very high relative to such other layers. On the other hand, for practical application, the resistivity of the novel layer should be adjusted to be higher than that for a vidicon target use, in order to prevent lateral leakage during the relatively long times between storage of the charge pattern and between the printing of the reproduction as compared to the 1/30 second such time for a vidicon. Another feature of the novel layer which makes it particularly useful for photoreproduction is that the surface of the alloy thermalizing layer is rugged and protects the underlying layers from atmospheric contamination, while being itself relatively unaffected by exposure to the atmosphere.

We claim:

1. A photosensitive charge storage electrode comprising:

a. a photoconductive substrate having a bulk region with a surface region of reduced electrical conductivity; and b. a layer of selectively insulating selenium glass on the surface of said surface region, said layer being more conductive to holes than to electrons across its thickness, said selenium glass having a bandgap such that the top of the valence band in said glass is essentially at the same energy level as the top of the valence band in said bulk region of said photoconductive substrate, said glass consisting essentially of from about 7 to about 12 atomic percent arsenic, from about 14 to about 39 atomic percent tellurium, and from about 49 to about 69 atomic percent selenium.

2. The electrode defined in claim 1 wherein said layer is from about 50 nanometers to about 1,000 nanometers thick.

3. A photosensitive charge storage electrode comprising:

a. a photoconductive substrate having a bulk region with a surface region of reduced electrical conductivity and consisting essentially of cadmium selenide having a surface region containing a conductivity reducing modifier; and b. a layer of selectively insulating glass on the surface region, said layer being more conductive to holes than to electrons across its thickness, said layer consisting essentially of an alloy of arsenic, tellurium, and selenium and having:

i. a thickness of from about 50 to about 1,000 nanometers, and ii. a bandgap such that the top of the valence band in said material is essentially at the same energy level as the top of the valence band in said bulk region of said photoconductive substrate.

4. The electrode defined in claim 3 wherein said surface region is less than 5 nanometers thick, said conductivity reducing modifier is oxygen, said insulating layer glass is an alloy of about 12 atomic percent arsenic, about 29 atomic percent tellurium, and about 59 atomic percent selenium, said insulating layer being about 950 nanometers thick.

* * * * *